Patented Aug. 8, 1939

2,168,651

UNITED STATES PATENT OFFICE 2,168,651

PACKAGING PROCESS AND MEDIUM

Thomas A. McCoy, Oakland, Calif.

No Drawing. Application June 30, 1936,
Serial No. 88,213

8 Claims. (Cl. 93—2)

The present invention relates to packaging and sealing materials ordinarily prepared in the form of thin, transparent sheets, and more particularly to stabilized rubber hydrohalide materials of this class, such as are described in the United States patent to Calvert No. 1,989,632 dated January 29, 1935, to which reference is made for a full disclosure of such details of the composition and preparation of the materials concerned, as are not fully set forth herein.

It is an object of the invention to provide a film of this character having substantially increased extensibility, toughness, and elasticity, whereby it may be applied to irregularly shaped articles or to articles having sharp projections without risk of puncturing the film.

It is a further object of the invention to provide a method of packaging irregularly sized articles in uniformly sized pieces of such film so as to present a uniform and neat packaged appearance of such articles.

The foregoing objects and others ancillary thereto are preferably accomplished by the hereinafter described treatment of a material of the class described in the aforesaid patent, one such material being commercially available under the name "Pliofilm."

Such materials are thermoplastic, softening and becoming sticky at temperatures in excess of 110° C., which permits packages to be sealed by the application of heat and pressure to the seams. This change in the physical characteristics of the material is not sudden but progressive, however, and it has been discovered that in heating such material a very marked increase in the extensibility, toughness, and elasticity thereof accompanied by a shrinkage of about 10% to 15% in the area of the sheet occurs sufficiently before the material becomes sticky, to permit avoidance of any objectionable degree of stickiness by discontinuing the heating. The extensibility of the sheet may be increased in excess of one hundred per cent by this means.

The extensibility, toughness, and elasticity thus imparted to the material is not lost upon cooling thereof, but is retained for a long period thereafter, indicating a chemical change in the material itself. This is believed to include the formation of a reaction product of the unsaturated rubber hydrochloride and hexamethylene tetramine used as a stabilizer in the commercial form of the "Pliofilm." Whether or not this is the case, however, it is apparent that the presence in the compound of a photochemical inhibitor of the class disclosed and claimed in the aforesaid patent, retards a return of the heat treated film to its original low degree of extensibility and elasticity, just as it retards the physical and/or chemical changes in the original film which would otherwise render it brittle within a short time.

In order to take advantage of the shrinkage phenomena above described, the selected material is, preferably, first applied to an article as a wrapper and sealed in the usual manner. The entire surface of the wrapper is then subjected to heat until the shrinkage, which may be visually observed, takes place, whereupon the heating is discontinued before the film has become objectionably sticky. The article is thereby covered with a transparent film shrunk to closely embrace its surface, and much more resistant to rupture than the original film, since its elasticity permits it to give freely under strains imposed by rough handling, et cetera.

An example of an application of the present invention is the use of "Pliofilm" as a wrapper for various kinds of fruits and vegetables. An artichoke, for instance, is placed between two sheets of commercial "Pliofilm" which are then cut to present contiguous edges which are thereupon sealed together to enclose the article. The entire surface of the package is then heated by means of a hot blast of air, radiant heat, or the like, until shrinkage takes place bringing the "Pliofilm" into close contact with the vegetable. The heating is preferably effected by a source of heat which will bring the film to a temperature of 95°–110° C., within about five seconds, so that a minimum of heat will be transmitted to the enclosed vegetable during the shrinking process. Hot air heat is preferable to radiant heat for the same reason.

As soon as the shrinkage has taken place, the heating is discontinued to avoid injury to the enclosed article and to avoid rendering the "Pliofilm" objectionably sticky; that is, before it has any tendency to adhere to other materials. A slight tendency thereof toward self-adhesion is not objectionable because ready separation may be effected without risk of rupturing the wrapper on account of its great toughness and elasticity.

This toughness and elasticity imparted by the heat treatment above described is of particular importance in connection with the packaging of irregularly shaped articles having sharp projections, such as artichokes, for while the sharp leaves of this vegetable would readily puncture untreated "Pliofilm" or similar transparent wrapping materials, they merely deform, without puncturing, the touch elastic material provided by the present invention.

The shrinkage effected by this heat treatment makes it possible to use one size of wrapper for a plurality of sizes of irregularly sized articles such as vegetables or fruits within a given grade, which do not vary widely in size, and yet secure a uniform, neat pack.

As an alternative, the "Pliofilm" may be subjected to the heat treatment above described before it is applied to the articles to be packaged. So conditioned, its toughness and elasticity are sufficient to permit it to be stretched so as to closely conform to the surface of the packaged article, and it may be completely cooled when applied.

In so packaging oranges, for instance, a continuously moving web of "Pliofilm" is passed before a source of heat, such as has been described above, during a sufficient period to produce the described increases in toughness and flexibility. Thereafter, preferably after the film has cooled, the fruit is pressed against the treated web so that the latter is stretched around it and may be sealed at a single point, as by forming a pig-tail of the web material and applying heat and pressure thereto. The "Pliofilm" being stretched, in this application, will conform uniformly to fruit of varying sizes.

The material and process of the present invention is not in any way limited to the examples cited, but may be applied in either way to either of the articles above cited and to vegetables, fruits, and edibles of all kinds either in boxes or individually, as well as to other articles of a perishable nature.

Additional applications of the invention include its use in sealing bottle necks, and the like, for which purpose it is sufficient to apply a loosely fitting cap of "Pliofilm" to the bottle or similar container, and then apply the heat treatment described above, continuing the same somewhat longer, however, in order to render the "Pliofilm" sticky enough to form a seal with the edges of the container.

Cardboard and other types of containers to which the "Pliofilm" closure will not readily adhere, may be sealed as above described by first securing adjacent the opening thereof, by means of any suitable adhesive, a circumferential strip of "Pliofilm" to which the "Pliofilm" closure will adhere under the influence of the heat treatment described above.

It has also been observed that "Pliofilm" which has been subjected to heat treatment such as has been described above, does not become brittle with aging nearly as quickly as does untreated material of the same character, and it is therefore one of the objects of the invention to produce a superior and longer lived form of this material by subjecting the material of the Calvert patent above identified to heat treatment of the character described herein. Such treatment for the purpose solely of prolonging the useful life of the material need not be carried to the same extent as is desirable when marked increases of extensibility, toughness and elasticity are desired; and it will therefore be sufficient for such a purpose to expose the original material to the source of heat for a shorter period of time or to a lower temperature, or both, depending upon the degree to which it is desired to carry the noted effect.

Although certain specific embodiments and applications of the invention have been described, it will be apparent that many modifications thereof are possible. The invention therefore is not to be considered as restricted except insofar as is necessitated by the prior art and by the spirit of the appended claims.

I claim:

1. A method of packaging which includes the steps of sealing an article at atmospheric pressure in a loosely fitting wrapper consisting of a stabilized rubber hydrohalide, and heating the entire surface of said wrapper to a temperature and for a time sufficient to shrink the same to closely embrace the surface of the article without imparting even temporary tackiness to said wrapper.

2. A method of packaging which includes the steps of heating a film of stabilized rubber hydrohalide until the same acquires a high degree of elasticity, and stretching the same in contact with the surface of an article to be wrapped therein.

3. A method of applying a container closure which includes the steps of covering a container opening with a loosely fitting cap of stabilized rubber hydrohalide and applying heat to the entire cap sufficient to shrink the same over said opening without imparting tackiness to the entire cap.

4. A method of applying a container closure which includes the steps of securing to the container, adjacent an opening thereof, a circumferential strip of stabilized rubber hydrohalide, covering said container opening with a loosely fitting cap of stabilized rubber hydrohalide, and applying heat sufficient to seal said cap to said strip.

5. A method of packaging which includes the steps of enclosing an article to be packaged at least partially with a film which includes a rubber hydrohalide and a substance of such character and in such an amount as to retard photochemical disintegration of the rubber hydrohalide and which has been heated to about 95°–110° C. for about five seconds.

6. A method of packaging which includes the steps of enclosing an article to be packaged at least partially with a film which includes a rubber hydrohalide and a substance of such character and in such an amount as to retard photochemical disintegration of the rubber hydrohalide and which has been heated to a temperature and for a time sufficient to shrink said film about 10% without imparting even temporary tackiness to said film.

7. A method of packaging which includes the steps of sealing an article in a loosely fitting wrapper of a stabilized rubber hydrohalide and heating the so wrapped article to raise the temperature of substantially only the wrapper to shrink said wrapper about 10% without imparting even temporary tackiness to said wrapper.

8. A method of packaging which includes the steps of sealing an article in a loosely fitting wrapper of a stabilized rubber hydrohalide and heating the so wrapped article to raise the temperature of substantially only the wrapper to 95°–110° C. for about five seconds.

THOMAS A. McCOY.